Patented Nov. 24, 1942

2,303,305

UNITED STATES PATENT OFFICE 2,303,305

PREPARATION OF TITANIUM DIOXIDE

Peter Tillmann, Cologne-Deutz, and Friedrich Raspe, Leverkusen-I. G. Werk, Germany, assignors to Titan Company, Inc., Wilmington, Del., a corporation of Delaware No Drawing. Application April 28, 1938, Serial No. 204,838. In Germany April 29, 1937

10 Claims. (Cl. 23—202)

This invention relates to a process of preparing titanium dioxide especially $TiO_2$ pigments possessing very high tinting strength and to the products obtained by these processes; it has special reference to the preparation of rutile titanium dioxide pigments. By "rutile titanium dioxide" is meant titanium dioxide having the crystalline structure of rutile as distinguished from titanium dioxide having the crystalline structure of anatase or brookite.

Attention is directed to the co-pending applications, Ser. No. 304,323, filed November 14, 1939, by P. Tillmann and F. Raspe, drawn to hydrolyzing a titanium salt solution with a sol formed from a univalent anion titanium salt solution, prepared by diluting the solution with hot water followed by subsequent heat treatment, and to Ser. No. 238,358, filed November 2, 1938, by P. Tillmann, F. Raspe and J. Heinen, is drawn to a process of hydrolyzing a solution of a hydrolyzable titanium salt in admixture with a nucleating sol prepared by peptizing titanium hydrate obtained from a titanium salt solution with a peptizing agent having a univalent anion.

Commercial processes for the preparation of titanium dioxide currently in vogue include the hydrolytic precipitation of hydrous titanium dioxide from mineral acid solutions, principally sulfuric acid solutions of titanium. The hydrous titanium dioxide so obtained is thereafter calcined in order, among other reasons, to develop crystalline characteristics upon which, in a large measure, the pigment properties of the finished titanium dioxide depend. The control of the hydrolysis has been recognized to be of considerable importance both with respect to the economics of the process and also with respect to the pigment properties of the titanium dioxide produced. By the use of nuclei the course of the hydrolysis and also the properties, e. g., color, particle size, uniformity, etc., of the precipitated hydrous titanium dioxide are favorably influenced.

The present invention is based upon the discovery that if the titanium constituent of a solution of a titanium compound having univalent anions is converted into a sol, this sol after suitable ripening will exert a nucleating effect when admixed with titanium salt solutions which are to be hydrolyzed. Furthermore, the nucleation sols which are one of the objects of the present invention, impart favorable high tinting strength to titanium dioxide pigments prepared by processes including the use of these nucleating sols. It has even been found that when titanium sulfate solutions are hydrolized in admixture with these sols, rutile titanium dioxide is obtained directly upon calcination at moderate temperatures for instance about 800° C. This result is contrary to what might be expected from a hydrolysis of titanium sulfate solutions as described by Weiser and Milligan. (J. Phys. Chem., vol. 38, page 513, 1934).

In the preparation of the nucleating sols, any method may be employed by means of which a titanium compound is converted into a sol said sol having univalent anions; for example, a controlled heat treatment of a titanium salt solution having univalent anions for such time as the titanium constituent contained therein is converted into the sol state is one convenient method. On the other hand, a solution of a titanium compound having univalent anions may be diluted to such an extent that on standing the titanium values will tend to become colloidal after which it may be subjected to a dialysis whereby a colloidal solution of titanium complexes substantially separated from the univalent anions is obtained, and then this colloidal solution is moderately heated for ripening it in order to develop the nucleating properties of the sol.

It will be seen that since dilution of solutions of titanium compounds having univalent anions tends to produce a colloidal condition of the titanium constituents, a control of the concentration of the titanium in the solution used for the preparation of the sol is of value in commercial adaptations of the invention. Thus, we have found that a nucleating sol is most conveniently prepared when using solutions of titanium compounds with univalent anions having a concentration calculated at $TiO_2$ of from between about 10 to about 20 grams per liter. While, in order to produce the highest quality ultimate product as regards tinting strength, color, etc., it may be preferred that the sol be prepared from substantially pure titanium solutions, the presence of iron or organic impurities does not adversely affect the nucleating efficiency of the sols. However, should iron be present it should be in the reduced, or ferrous, state.

The conversion of the titanium compound into a sol, whether produced by a simple heat treatment or by a dialysis combined with a subsequent heat treatment or by any other usual way can be followed by well recognized physical changes.

The ripening i. e. heat treatment of the sol having univalent anions develops the nucleating properties of the sol. To develop the best properties it is advantageous to heat the sol to temperatures of between about 70° C. to at most the boiling point of the sol. The heating time is of considerable importance, so that at lower temperatures a longer time is needed to develop the nucleating properties and at higher temperatures a shorter time will suffice. We have found that optimum results are obtained by heating the sol to 80 to 90° C. for about 10 to 15 minutes, when the content of $TiO_2$ in the sol is about 10 to 20 grams per liter.

The sol obtained shows a slight opalescence and is ready for use. The particles cannot be removed by ordinary means such as filtration and consequently are not definite macroscopic particles which, for example, may be removed from the liquid by filtration and washed.

Furthermore, the degree of dispersion of the colloidal titanium dioxide and the homogeneity thereof do not appear to exert any important bearing on the nucleating properties of the sols. Thus, sols in which the titanium dioxide is dispersed to varying degrees may be mixed and the resultant mixed sols used as nuclei to obtain the improved results of the present invention.

Having described the novel nucleating sols and their preparation; their use in the hydrolysis of titanium salt solutions will now be described.

The practice of the present invention is not limited to the use of any particular type of titanium solution to be hydrolyzed. Thus, it is equally adaptable for the hydrolysis of titanium sulfate solutions, as for titanium chloride solutions or in fact, any titanium solution from which hydrous titanium dioxide may be precipitated by thermal hydrolysis. The concentration of the titanium solution to be hydrolyzed is of no great consequence as regards the function of the nucleating sol although it should be pointed out that the best results are obtained when using basic titanium solutions. By "basic titanium solutions" are meant titanium solutions containing less acid, for instance, sulfuric acid, calculated as free and combined with titanium, than would theroretically be required to form the normal titanium salt, for instance, normal titanium sulfate, $Ti(SO_4)_2$. The concentrations of the titanium solution to be hydrolyzed may also be controlled to obtain the best results. Thus, we have found it advantageous to maintain the concentrations of titanium sulfate solutions, where such are employed, between about 130 grams $TiO_2$ per liter and 150 grams per liter, preferably about 140 grams per liter. When titanium tetrachloride solutions are to be hydrolyzed it may be preferred to employ solutions containing about 150 grams $TiO_2$ per liter, or within the range of 140 grams to 160 grams per liter.

The relative quantity of nucleating sol to titanium solution to be hydrolyzed should also be controlled to obtain the best results. For example, when hydrolyzing titanium tetrachloride, nitrate or fluoride solutions, the amount of nucleating sol to be employed should be such that it will yield about 5 per cent to about 9 per cent of the total titanium dioxide to be precipitated from the mixed nucleating sol and titanium solution to be hydrolyzed. When employing titanium sulfate solutions, the nucleating sol should be used in slightly larger quantities, preferably in amounts to yield about 9 per cent to about 12 per cent of the total amount of $TiO_2$ to be obtained.

In general it may be stated that the higher the degree of basicity of the solution to be hydrolyzed and the greater the concentration of titanium contained therein the smaller will be the amount of nucleating sol required. Thus, when employing titanium sulfate solutions containing between about 140 to 150 grams $TiO_2$ per liter and having a degree of basicity corresponding to the ratio of $TiO_2:H_2SO_4$ of 1:1.4, a sufficient amount of nucleating sol to yield about 10 per cent of the total titanium dioxide should be used. By increasing the concentration of $TiO_2$ to 200 grams or more per liter while preserving the same degree of basicity the amount of nucleating sol required can be reduced by one-half. When the degree of basicity is increased, e. g. to a ratio of $TiO_2:H_2SO_4$ of 1:0.84 while holding the concentration of $TiO_2$ at about 140 grams per liter only sufficient nucleating sol need be used to yield about 7.5 per cent of the total titanium dioxide to be precipitated.

From the aforesaid it will be apparent that for obtaining optimum results the quantity of the sol and the content of $TiO_2$ and acid of the titanium salt solution must be adjusted to one another.

The manner of mixing the nucleating sol with the titanium solution to be hydrolyzed may also exert some influence on the results obtained. In effecting the hydrolysis it is advantageous to add the solution to be hydrolyzed to the sol.

The nucleating effect of the sols of the present invention, particularly the great acceleration of the rate of the hydrolysis, is such that our present invention readily lends itself to conducting the hydrolysis process in a continuous manner. Thus, it has been found that a continuous preparation of nucleating sol, continuous mixing of sol and solution and simultaneous continuous hydrolysis may be carried out in a suitable apparatus consisting of pipes, circulating pumps, and means for externally applying heat to the pipes.

In such a continuous process, the solution containing the titanium compound having univalent anions is run through a heated pipe at a predetermined rate of flow so regulated that it is converted into the nucleating sol before coming in contact with the titanium solution to be hydrolyzed, which is introduced into the system from a second pipe externally heated, if desired. The two liquids may be then brought in contact with each other on entering a pipe in which the mixed liquids are circulated while being heated until hydrolysis is complete. The rates of flow of the respective liquids and the quantity of liquids handled may be controlled according to well known hydrostatic principles, by means of pumps, check valves, and pipes of predetermined diameter.

Advantage may be taken of increased pressure to effect the hydrolysis at temperatures exceeding the normal boiling point, thereby still further increasing the rate of hydrolysis.

Hydrolysis according to the present invention takes place smoothly and evenly, when the solution is heated up to temperatures approaching the normal boiling point, or above. The time of hydrolysis is, however, very materially lessened. While there may be some variation in time due to the quantity of material heated, it has been found, after repeated experiments, that the hydrolysis is usually completed with high yields of about 95 per cent $TiO_2$ and over after heating for between about 15 minutes and about one hour. But, for the most part, hydrolysis is completed after about 30 minutes when heating at the boiling point.

The following examples will more specifically illustrate the present invention:

*Example 1.—Illustrating the preparation and the use of nucleating sol derived from titanium tetrachloride for the preparation of rutile titanium dioxide from a titanium sulfate solution*

One liter of an aqueous solution of titanium tetrachloride containing 10 grams $TiO_2$ per liter is placed in a suitable vessel equipped with a stirring device, a reflux condenser, and a thermometer. While agitating the solution the temperature is raised to 85° C. by means of externally applied heat. At about 65° C. the first appearance of a bluish-green opalescence may be observed. The solution is maintained at 85° C. for about 12 minutes after which it is ready for use as a nucleating sol. After the 12 minutes heating the heat is cut off and about 700 cc. of a titanium sulfate solution analyzing as follows:

| | | |
|---|---|---|
| Sp. gr | | 1.420 |
| $TiO_2$ | g./l | 145.0 |
| $H_2SO_4$ | do | 264.8 |
| $TiO_2$ (reduced) | do | 1.2 |
| $FeSO_4$, ca | do | 170 | are run into the vessel containing the nucleating sol. During this addition the temperature will drop to about 60° C. Hydrolysis of the titanium sulfate begins as soon as the addition starts as is indicated by change in color from a bluish-green opalescence to a greyish-blue opalescence. As soon as the addition is complete the temperature is raised to the boiling point. In one such procedure about 20 minutes were required during which hydrolysis proceeded steadily as indicated by changes in color from the greyish-blue opalescence through ever lightening shades of grey until, at the boiling point, the hydrolysis solution was white with a grey-green tint. Hydrolysis, with a yield of about 96 per cent of available $TiO_2$ is completed after about 15 minutes boiling.

When the solution has cooled to about 80° C. the precipitated hydrous titanium dioxide is washed, in the well known manner, free of iron and acid mother liquor, dried and calcined. After pulverizing the calcined product a white pigment consisting of rutile titanium dioxide of uniform particle size averaging about 0.5 to 0.6 micron and being substantially free from aggregates or particles in excess of 2 microns is obtained. When tested by the well known Reynolds method it was found to have a tinting strength of about 1625.

*Example 2.—Illustrating the hydrolysis of a titanium tetrachloride solution using a nucleating sol derived from titanium tetrachloride*

One liter of an aqueous solution of titanium tetrachloride containing 15 grams $TiO_2$ per liter is heated to between 80° C. and 85° C. After heating for about 10 minutes at this temperature, 1250 cc. of a titanium tetrachloride solution containing 150 grams $TiO_2$ per liter are added thereto. The mixture is heated to the boiling point and boiled for one-half hour. After the usual filtration, washing, drying, calcination and pulverization treatments a pigment is obtained which when compared with the usual commercial types of titanium dioxide pigments of similar composition possesses a 20 to 25 per cent higher tinting strength.

*Example 3.—Illustrating the hydrolysis of a titanium nitrate solution using a nucleating sol derived from titanium tetrachloride*

One liter of an aqueous solution of titanium tetrachloride containing 15 grams $TiO_2$ per liter are heated to between 80° C. and 85° C. After heating for about 10 minutes at this temperature, 1250 cc. of a titanium nitrate solution containing about 150 grams $TiO_2$ per liter are added thereto. The mixture is heated to the boiling point and boiled for one hour. After separating the precipitated hydrous titanium oxide from the mother liquor, washing, drying, calcining and pulverizing, a pigment substantially identical with the products obtained from Examples 1 and 2 is obtained.

*Example 4.—Illustrating the preparation of the nucleating sol from a titanium nitrate solution and the use of such a sole in the hydrolysis of a titanium sulfate solution*

One liter of an aqueous titanium nitrate solution having a $TiO_2$ content of about 10 grams per liter are heated to between 80° C. and 85° C. After 10 minutes heating at this temperature, 720 cc. of a titanium sulfate solution containing about 140 grams $TiO_2$ per liter are added thereto. The mixture is then heated to the boiling point and boiled for about one-half hour. After subjecting the precipitated hydrous titanium oxide to the usual filtration, washing, drying, calcination and pulverization treatments, a pigment substantially identical to that obtained according to Example 1 is obtained.

*Example 5.—Illustrating the preparation of a nucleating sol from a titanium fluoride solution and the use of such a sol in the hydrolysis of a titanium sulfate solution*

One liter of an aqueous titanium fluoride solution containing about 10 grams $TiO_2$ per liter is heated to between 80° C. to 85° C. After about 10 minutes heating, 720 cc. of a titanium sulfate solution containing about 140 grams $TiO_2$ per liter is added thereto. The mixture is heated to the boiling point and is boiled for about one-half hour. After the usual treatments of the precipitated hydrous titanium oxide a white pigment, which is also substantially identical with that obtained from the process of Example 1 is obtained.

*Example 6.—Illustrating the adaptation of the present invention to a continuous hydrolysis*

Into one tube of a suitable apparatus consisting of two tubes joined or connected with a third tube, each of which are provided with means for applying heat an aqueous titanium tetrachloride solution containing about 10 grams per liter is permitted to flow at a rate regulated by a circulating pump so that the solution is maintained in the tube for about 15 minutes at a temperature of 85° C. Into the second tube of the apparatus a titanium sulfate solution, similar in composition to the one employed in Example 1 is heated to 90° C. The nucleating sol prepared in the first tube and the heated titanium sulfate solution are allowed to mix in the third or connecting tube of the apparatus. The rate of flow into this third tube from the other two tubes is maintained by means of circulating pumps and valves so that for every liter of titanium sulfate solution discharged into the third tube there will be discharged from the first tube about 1.4 liters of the nucleating sol. The mixed solutions are circulated in a third tube for about 15 minutes, the temperature being maintained at about that of the boiling point under normal pressure conditions, viz. about 104° C. In such a manner hydrolysis may be carried out in a continuous manner to obtain at the discharge end of the apparatus hydrous titanium oxide which when filtered, washed, dried, calcined and pulverized, will be substantially identical to the product obtained under Example 1.

*Example 7.—Illustrating the fact that the degree of dispersion of the titanium dioxide in the nucleating sols and the homogeneity thereof are not important*

An aqueous titanium tetrachloride solution containing about 10 grams $TiO_2$ per liter is allowed to stand at room temperature for a prolonged period of between four and five days. During this period a gradual clouding of the solution occurs indicating the gradual transition of the titanium from crystalloid to colloid condition. At the end of this period the colloidal titanium dioxide has formed a sol in which the titanium complexes are relatively coarsely dispersed. For the purposes of this example, this coarse, but dispersed sol is designated sol A. This sol is then heated at about 85° C. for a few minutes.

A second titanium tetrachloride solution of similar composition to that from which sol A was prepared was heated directly to 85° C. and maintained there for about 10 minutes. There is at once formed a colloidal sol of $TiO_2$ which is designated sol B.

500 cc. of sol A and 500 cc. of sol B are mixed while at a temperature of about 80° C. to 85° C. 720 cc. of a titanium sulfate solution analyzing like the solution employed in Example 1 is added to the mixture of sol A and sol B. The resultant mixture is heated to the boiling point and maintained there for about one-half hour. After filtration and the usual after-treatments a white pigment is obtained exhibiting all the improved properties of pigments obtained from the present invention.

*Example 8.—Illustrating the preparation of the nucleating sol by dialysis*

An aqueous solution of titanium tetrachloride containing about 20 grams $TiO_2$ per liter is placed in a membraneous sack prepared from collodion. When this sack containing the tetrachloride solution is immersed in distilled water, the chloride ion, due to difference in osmotic pressure, passes through a membrane into the water. After a prolonged dialysis of about two days, the membraneous sack contains a sol in which the titanium dioxide is in a colloidal state. When this sol is heated for ripening for a few minutes at about 85° C., the resultant titanium dioxide sol may be employed in the practice of the present invention.

*Example 9.—Illustrating the use of various amounts of nucleating sol with respect to the solutions to be hydrolyzed*

1000 parts by volume of a titanium tetrachloride solution with a titanium concentration corresponding to 10 g. of $TiO_2$ per liter are heated to 85° C. After heating for 10 minutes 1000 parts by volume of a titanium sulfate solution with a concentration of 200 g. $TiO_2$ per liter, about 350 g. per liter of free sulfuric acid and 80–90 g. per liter of iron in the form of ferrous sulfate are added while stirring, so that the proportion of the $TiO_2$ as nucleus to the $TiO_2$ to be precipitated is 5:100. The mixture is heated to boiling, kept boiling for half an hour and then filtered. After washing and calcining a pigment is obtained similar to that described in Example 1.

*Example 10.—Illustrating the use of various amounts of nucleating sol with respect to the solutions to be hydrolyzed*

1080 parts by volume of a titanium tetrachloride solution with a titanium concentration corresponding to 10 g. of $TiO_2$ per liter are heated to 85° C. for about 12 minutes. Thereupon 1000 parts by volume of a titanium sulfate solution with a $TiO_2$ content corresponding to 144 g. per liter, a sulfuric acid content corresponding to 204 g. per liter and an iron content of about 60–70 g. per liter in the form of ferrous sulfate, are added while stirring, so that the proportion of the $TiO_2$ as nucleus to the $TiO_2$ to be precipitated is 7.5:100. The mixture is heated to boiling and kept boiling for half an hour. After filtration, washing and calcining and corresponding after-treatment a pigment is obtained similar to that described in Example 1.

*Example 11.—Illustrating the use of various amounts of nucleating sol with respect to the solutions to be hydrolyzed*

1080 parts by volume of a titanium tetrachloride solution with a titanium concentration corresponding to 10 g. of $TiO_2$ per liter are heated to 85° C. After heating for 10 minutes 1000 parts by volume of a titanium sulfate solution with a $TiO_2$ content corresponding to 144 g. per liter and an iron content corresponding to about 60–70 g. per liter of the form of ferrous sulfate are added while stirring, so that the proportion of the $TiO_2$ as nucleus to the $TiO_2$ to be precipitated is 7.5:100. The mixture is heated to boiling and kept boiling for about half an hour. After washing and calcining a pigment is obtained similar to that described in Example 1.

*Example 12.—Illustrating the use of various amounts of nucleating sol with respect to the solutions to be hydrolyzed*

700 parts by volume of a titanium tetrachloride solution with a titanium concentration corresponding to 20 g. of $TiO_2$ per liter are heated to 85° C. After heating for 10 minutes 710 parts by volume of a titanium sulfate solution of a $TiO_2$ content corresponding to 141 g. per liter, a sulfuric acid content corresponding to 256.4 g. per liter and an iron content corresponding to about 65 g. per liter in the form of ferrous sulfate are added while stirring. The proportion of the $TiO_2$ as nucleus to the $TiO_2$ to be hydrolyzed is 14:100. The mixture is heated to boiling and kept boiling for about half an hour. After washing and calcining a pigment is obtained similar to that described in Example 1.

The methods of the present invention are not limited to the preparation of pure titanium dioxide pigments, but are equally adapted to the preparation of composite pigments by any of the well known prior methods.

The optimum titanium dioxide pigments obtained from the present invention are characterized primarily by their exceptionally high tinting strength, which will be found to be about 20 to 25 per cent above the present day titanium dioxide pigments produced from titanium sulfate solutions. The commercial pigments of the prior art possess tinting strengths as determined by the well known Reynolds method, of about 1200–1300, whereas pigments produced according to the present invention possess tinting strengths, as determined by the same method, of about 1600.

This high tinting strength may be attributed to the fact that the titanium dioxide in the products of our invention is present as rutile titanium dioxide. While rutile titanium dioxide pigments which may have been prepared by experimental prior art methods may be found to possess a somewhat higher tinting strength than anatase titanium dioxide produced from titanium sulfate solutions by the present commercial methods, no such experimental prior art methods are commercially adaptable for the preparation of rutile titanium dioxide pigments. Furthermore, the titanium dioxide pigments obtained in accordance with the present invention can be produced on a commercial scale possessing an extremely homogeneous particle size (sometimes referred to in this art as "grain structure"). When examined microscopically the products of our invention will be found to possess an average diameter of about 0.5–0.6 micron. It will be further observed under the microscope that products of the present invention are substantially free from extremely fine particles as well as from coarse particles or aggregates. Thus, under the microscope it would be difficult to find in products of the present invention any particles having a diameter less than 0.2 micron or greater than 2.0 microns.

The color of the products of the present invention, provided the usual precautions with respect to color which obtain in the manufacture of titanium pigments are observed, is substantially white. When incorporated in any of the usual film-forming vehicles, the pigments of the present invention form surface coating compositions which exhibit exceptional chalk-resisting properties when such compositions are exposed out-of-doors.

We claim:

1. Process for the preparation of a sol of titanium dioxide possessing nucleating properties with respect to the hydrolysis of hydrolyzable titanium salt solutions, which consists in heating an aqueous solution of a titanium salt having univalent anions and containing an amount of titanium, calculated as $TiO_2$ between about 10 to about 20 grams per liter at temperatures between about 70° C. to at most the boiling point of the sol until a slightly opalescent, non-filtrable, colloidal solution of titanium dioxide is obtained, and then discontinuing the heating.

2. A process as defined in claim 1, wherein the heating is carried out at temperatures between about 80° and about 90° C. for a period of about 10 to about 15 minutes.

3. A process as defined in claim 1, wherein the titanium salt employed is titanium tetrachloride.

4. A slightly opalescent, non-filtrable, aqueous sol of colloidal titanium dioxide possessing nucleating properties with respect to the hydrolysis of hydrolyzable titanium salt solutions and containing between about 10 to about 20 grams per liter of titanium, calculated as $TiO_2$, said sol being obtained by a process defined in claim 1.

5. Process for the hydrolytic decomposition of a hydrolyzable titanium salt solution, which comprises admixing with the titanium salt solution a sol of colloidal titanium dioxide containing between about 10 to about 20 grams per liter of titanium, calculated as $TiO_2$, prepared by a process defined in claim 1, and heating the mixture to precipitate hydrolytically titanium dioxide.

6. Process for the hydrolytic decomposition of a titanium sulfate solution, which comprises admixing with the titanium sulfate solution of sol of colloidal titanium dioxide containing between about 10 to about 20 grams per liter of titanium, calculated as $TiO_2$, prepared by a process defined in claim 1, and heating the mixture to precipitate hydrolytically titanium dioxide.

7. Process for the hydrolytic decomposition of a hydrolyzable titanium salt solution, which comprises admixing a sol of colloidal titanium dioxide containing between about 10 to about 20 grams per liter of titanium, calculated as $TiO_2$, prepared by a process defined in claim 1, with a hydrolyzable titanium salt solution containing between about 130 to about 160 grams per liter of titanium, calculated as $TiO_2$, in such proportions that between about 5 to about 12% of the total amount of $TiO_2$ in the mixture is derived from the sol, and heating the mixture to precipitate hydrolytically titanium dioxide.

8. Process for the hydrolytic decomposition of a titanium sulfate solution, which comprises admixing a sol of colloidal titanium dioxide containing between about 10 to about 20 grams per liter of titanium, calculated as $TiO_2$, prepared by a process defined in claim 1, with a titanium sulfate solution containing between about 130 to about 150 grams per liter of titanium, calculated as $TiO_2$, in such proportions that between about 9 to about 12% of the total amount of $TiO_2$ in the mixture is derived from the sol, and heating the mixture to precpicipitate hydrolytically titanium dioxide.

9. Process for the preparation of high tinting strength rutile titanium dioxide pigments, which comprises admixing a hydrolyzable titanium salt solution with a sol of colloidal titanium dioxide containing between about 10 to about 20 grams per liter of titanium, calculated as $TiO_2$, prepared by a process defined in claim 1, heating the mixture to precipitate hydrolytically titanium dioxide, calcining and pulverizing the precipitate.

10. Process for the preparation of a sol of titanium dioxide possessing nucleating properties with respect to the hydrolysis of hydrolyzable titanium salt solutions, which consists in heating an aqueous solution of a titanium salt having univalent anions and containing an amount of titanium, calculated as $TiO_2$, between about 10 grams to about 20 grams per liter, at a sufficient temperature and for a sufficient length of time to produce a colloidal solution of titanium dioxide having a slight stabilized opalescence and then discontinuing the heating.

PETER TILLMANN.
FRIEDRICH RASPE.